United States Patent Office 3,278,744
Patented Oct. 11, 1966

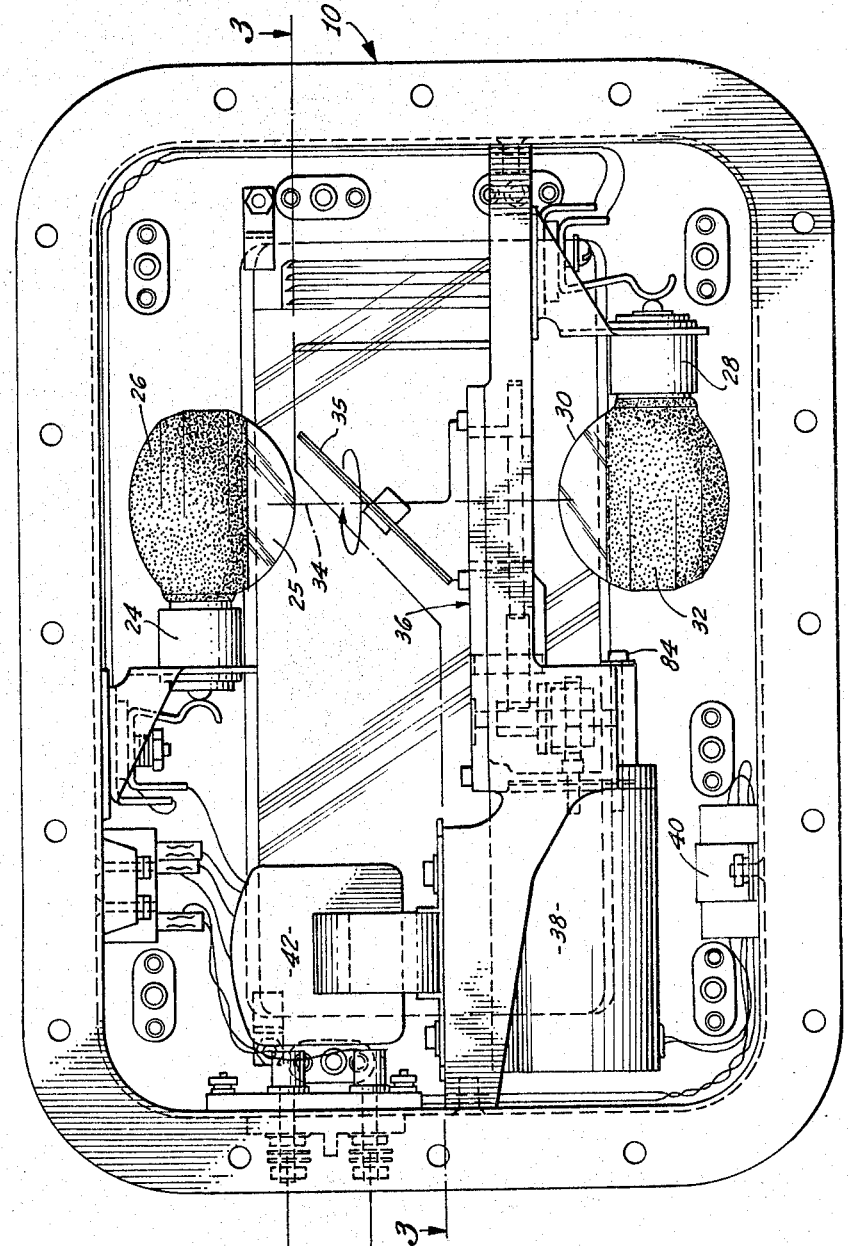

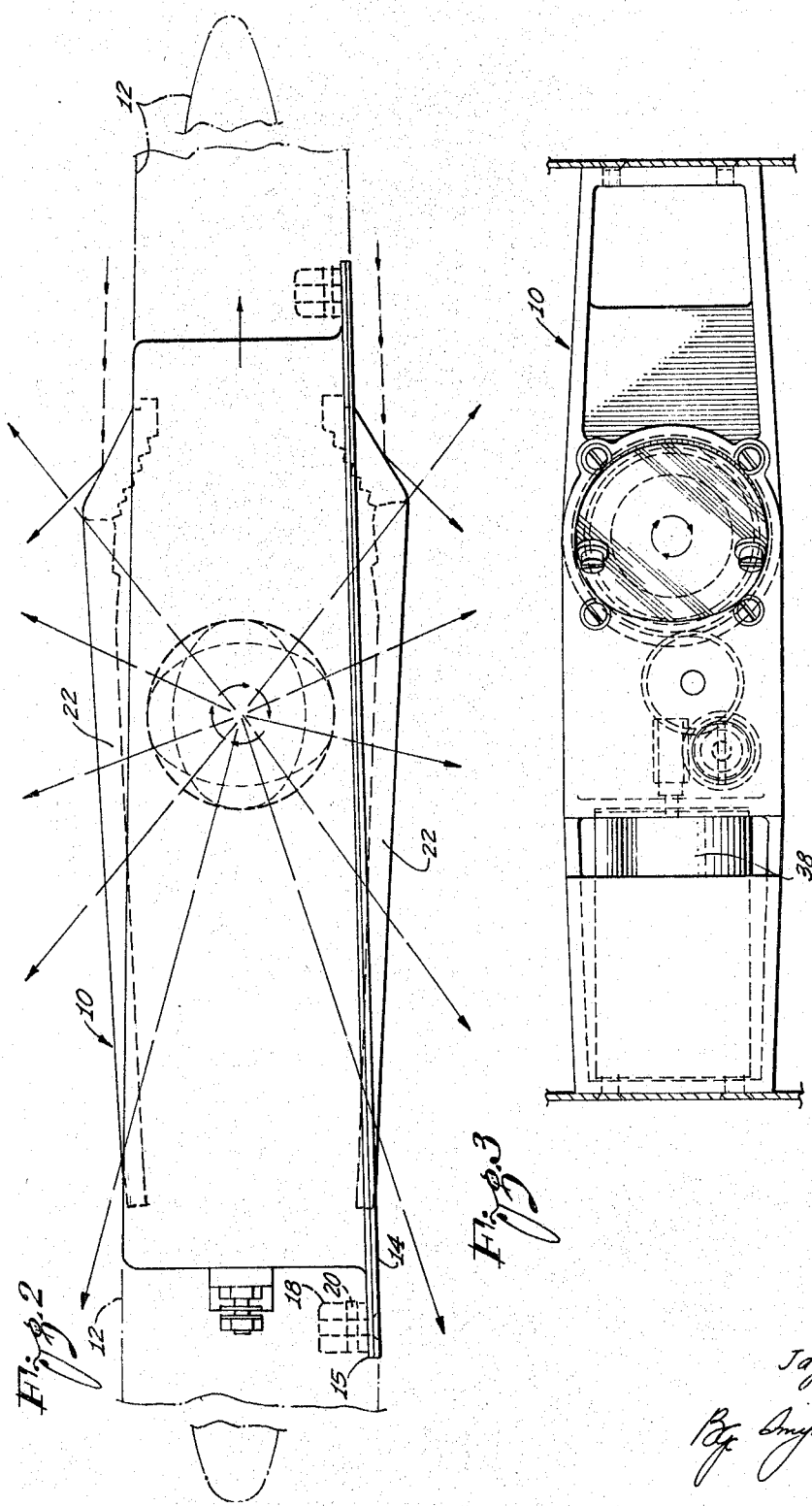

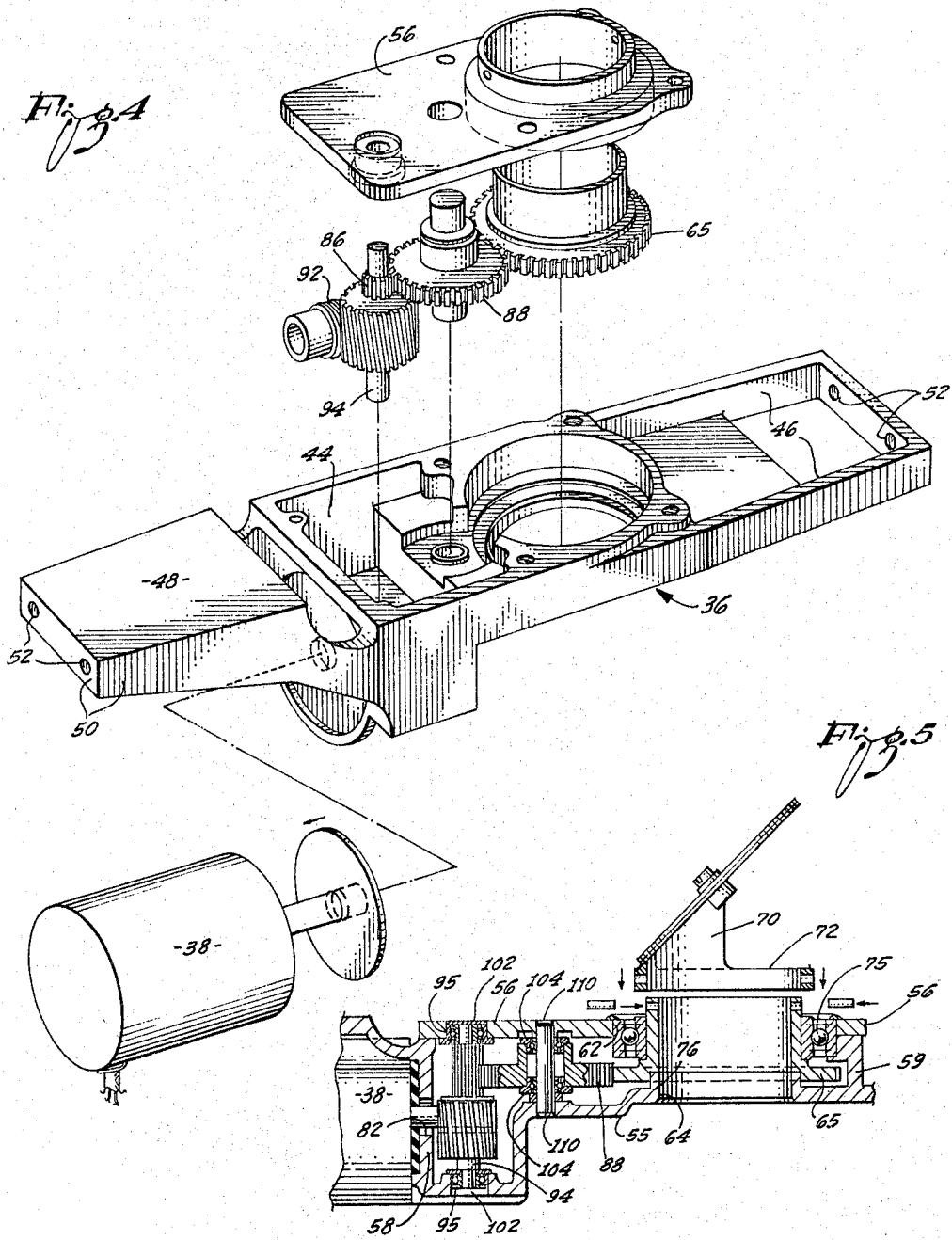

3,278,744
AIRCRAFT BEACON MECHANISM
Jay A. Harper, Gardena, Calif., assignor to Acme Machine Works, Inc., Hawthorne, Calif., a corporation of California
Filed July 31, 1964, Ser. No. 386,514
7 Claims. (Cl. 240—49)

This invention relates to a beacon light carried by an aircraft for flashing signals to minimize the risk of collision. More specifically, the invention relates to such an anti-collision light of the type in which a rotary double-faced mirror rotates on an upright axis between an upper lamp and a lower lamp with the double-faced mirror inclined relative to the axis to reflect two diametrically opposite rotating light beams from the two lamps respectively.

In a typical construction of such a beacon, the rotary mirror and the two lamps are mounted in a narrow upright lamp chamber that is incorporated in an upright aerodynamic fin, which fin may be, for example, the tail fin of an aircraft. The lamp chamber has opposite light-transmitting windows of red glass which form parts of the two opposite side surfaces of the upright fin. A motor and suitable reduction gearing are mounted in the same lamp chamber for driving the rotating mirror.

Since the purpose of such beacon is to promote flight safety, it is readily appreciated that reliability in the operation of the beacon is of utmost importance. Unfortunately, however, such aircraft beacons as heretofore constructed have relatively low reliability with short service lives and too often fail in the course of a flight.

It has been found that the basic difficulty is in the necessity that has heretofore existed for fully exposing the beacon mechanism in the beacon chamber and for running the mechanism without lubricant. The mechanism has heretofore been exposed in the chamber because the chamber is heated by the beacon lamps to a temperature of 350° F. or higher and any conventional lubricant employed at that temperature would be relatively liquid and would be splattered onto the lamp bulbs by the rotating parts. Any such splatter on a heated lamp bulb has an instant destructive effect.

With the gearing running without lubricant it is preferable to expose the gears to permit foreign particles to drop away from the gears instead of being trapped in a gear case. The foreign particles includes dust and particles produced by the wear on the moving parts. It has been found that without the use of lubricant, excessive vibration is unavoidable and rapid wear of the gears causes progressive increase in the intensity of the vibration with consequent destructive effect on both the rotating mirror and the two lamps.

It has long been recognized that excessive vibration is generated by the exposed dry mechanism and that the vibration has a destructive effect on the rotating mirror as well as on the two lamps. It has been known also that even with careful design of the moving parts an undesirable intensity of vibration is created as soon as a conventional rotary beacon is placed in service and that the vibration progressively increases over the service life of the mechanism. Nevertheless, no basic changes have been made to correct the situation.

The present invention solves the problem by making efficient lubrication possible thereby to avoid the creation of destructive vibration. The problem is solved in part by enclosing the moving parts of the mechanism in a sealed gear case of novel construction and is solved in further part by filling the gear case with a viscous lubricant which is capable of maintaining high viscosity at the elevated temperature in the lamp chamber.

The invention has a further objective of not only minimizing the initial cost of the new construction but of also drastically reducing the cost of repair and replacement of parts. The important features in this regard are the simple construction of the sealed gear case itself and the concept of incorporating all of the moving parts in the sealed gear case with provision for mounting the gear case in the lamp chamber in an easily removable manner.

The gear case with the moving parts therein is a unit that is fabricated apart from the chamber and thus avoids the awkward and time-consuming procedure of installing the moving parts piece by piece in the cramped space of the lamp chamber. Only four screws are required to install the self-contained unit in the lamp chamber and the heads of the four screws are readily accessible on the exterior of the chamber. If any kind of functional difficulty develops, a spare unit may be quickly substituted without the necessity of determining the cause of the difficulty.

The features and advantages of the invention may be understood from the following detailed description and the accompanying drawings.

In the drawings, which are to be regarded as merely illustrative:

FIG. 1 is a side elevational view of the lamp chamber with a side wall or cover removed to reveal the structure inside the chamber;

FIG. 2 is a plan view of the lamp chamber;

FIG. 3 is a section taken along the angular line 3—3 of FIG. 1 and showing the gear case in plan;

FIG. 4 is an exploded perspective view of the gear case and the reduction gearing that is mounted therein; and FIG. 5 is a fragmentary sectional view of the gear case showing the gearing therein.

As shown in FIGS. 1-3, the lamp chamber for the beacon is formed by a housing, generally designated 10, which is dimensioned and adapted for incorporation in an upright aerodynamic fin, generally designated 12, of an aircraft. One side wall of the housing is a cover or panel 14 which is removably secured to a peripheral flange 15 by screws 16 in cooperation with corresponding nuts and lock washers. The two opposite side walls of the chamber incorporate large rectangular windows or lenses 22 made of red colored heat-resistant glass.

As shown in FIG. 1, an upper socket 24 mounted on the upper wall of the chamber carries an upper lamp bulb 25 and the lamp bulb has a coating 26 over the major portion of its surface to serve as a mask and to reflect the light downward. In like manner, a lower socket 28 in the lamp chamber carries a lower lamp bulb 30 which has a coating 32 to serve as a mask and to reflect the light upward.

These two lamps define an upright axis indicated by the dotted line 34 and a double faced mirror 35 intersects the axis at an acute angle between the two lamps to reflect light beams therefrom. Thus the upper surface of the mirror 35 reflects a light beam horizontally from the upper lamp bulb 25 and the undersurface of the mirror reflects a light beam horizontally from the lower lamp bulb 30, the two light beams being 180° apart. With the mirror 35 rotating continuously, the result as observed from a distance is two flashes of light for each rotation of the mirror. The mirror may rotate at a rate of 40 to 90 r.p.m., the preferred angular velocity being approximately 55 r.p.m.

In accord with the teaching of the invention, the inclined mirror 35 and the mechanism for actuating the mirror are carried by a horizontal gear case, generally designated 36 that extends lengthwise of the lamp chamber and is removably mounted in the lamp chamber. The gearing inside the case 36 is actuated by a motor 38 in a closed motor housing 39. The circuitry for energizing the motor 38 includes a capacitor 40 and the circuitry for energizing the two lamp bulbs includes a transformer 42.

As best shown in FIG. 4 the gear case 36 may be in the form of a casting providing a gear compartment 44 with a shelf extension 45 formed with an upturned peripheral flange 46 at one end of the casting and with a second shelf extension 48 at the other end formed with a downwardly turned peripheral flange 50. Each of the ends of the two shelf extensions 45 and 48 is formed with a pair of screw holes 52 to permit the gear case to be secured to the housing 10 by four screws 54, the heads of the screws being conveniently exposed at the exterior of the lamp housing. The anchorage of the gear case by the four easily accessible screws makes it a simple matter to install or remove the gear case as a unit. In this regard a feature of the invention is that the transformer 42 is mounted on the upper side of the shelf 48 and the lower lamp socket 28 is mounted on the lower side of the shelf 45. Thus the only components that are not carried by the removable unit are the upper lamp socket 24 and the capacitor 40.

As best shown in FIG. 5, the gear case 36 has a bottom wall 55, a top wall 56 and a deep end wall 58 and an opposite shallow end wall 59. As shown in FIG. 4 the top wall 56 of the gear case is in the form of a removable cover, which as shown in FIG. 1, is normally attached in a sealed manner by suitable screws 60.

The gear case 36 intersects the vertical axis 34 that is defined by the two lamp bulbs and the gear case has suitable openings to permit light from the lower light bulb 30 to be transmitted through the gear case to the underside of the inclined mirror 35. For this purpose the top wall 56 of the gear compartment has a circular opening 62 concentric to the axis 34 and the bottom wall 55 has a circular opening 64 in alignment with the upper opening.

The inclined mirror 35 is carried by a ring-shaped gear 65 inside the gear case, the ring-shaped gear having outer circumferential teeth 66 and having an upward cylindrical extension 68 on which the mirror is mounted. As shown in FIG. 5 the inclined mirror is mounted on a semicircular extension 70 of a ring-shaped bracket 72 that is dimensioned to telescope over the cylindrical extension 68 of the ring-shaped gear 65, the bracket being secured by a pair of diametrically opposite fastening elements 74 such as screws or dowels. It is apparent that a light passage through the gear case from the lower lamp bulb 30 is formed by the ring-shaped gear 65 with its cylindrical extension 68.

The gear case is filled with a highly viscous lubricant capable of maintaining its high viscosity at temperatures in the range of 350°–500° F. In the preferred practice of the invention the lubricant is Uni Temp 500 which is sold by the Texas Oil Company.

It is essential that the light passage through the gear case for the light from the lower bulb 34 be of sealed construction to confine the high viscosity lubricant against leakage. For this purpose the ring-shaped gear 65 with its cylindrical extension 68 is mounted in the top wall 56 of the gear chamber by means of a sealed bearing 75 of a well known type that may be depended upon to prevent leakage of the lubricant. To seal the bottom wall 55 of the gear compartment around the lower circular opening 64 the bottom wall is formed with an upturned cylindrical flange 76 around the rim of the lower cylindrical opening 64 and this flange makes a snug fit with the ring-shaped gear 65. In the construction shown, the ring-shaped gear 65 is cut away on its lower side to form an annular seat 78 in which the cylindrical flange 76 telescopes with sufficient snugness to confine the highly viscous lubricant without interferring with rotation of the ring-shaped gear.

The closed housing 39 for the motor 38 is mounted on the end wall 58 of the gear compartment below the shelf extension 48 with the shaft 80 of the motor extending through an aperture 82 in the end wall. As indicated in FIG. 1 the motor housing 39 may be secured by relatively long screws 84 and to seal the aperture 82 in the end wall 58, the screws pull the motor housing tight against a suitable sealing gasket 85 that surrounds the wall aperture.

In the illustrated embodiment of the invention, the gearing that operatively connects the motor 38 with the ring-shaped gear 65 comprises a first gear 86 of relatively small diameter, a second gear 88 of larger diameter in mesh with both the first gear and with the ring-shaped gear 65, a worm gear 90 that is unitary with the first gear 86, and a worm 92 that is carried by the motor shaft 80 in mesh with the worm gear 90.

Any suitable means may be employed to mount and journal the various gears in the gear compartment. In the construction shown, the first gear 86 and the worm gear 90 are both fixedly mounted on an upright shaft 94 and the opposite ends of the upright shaft are journaled in corresponding ball bearings 95 that are mounted in corresponding apertures in the bottom wall 55 and the top wall 56 respectively. As shown in FIG. 5 the two ends of the shaft 94 and the two ball bearings 95 are offset inwardly from the outer surfaces of the gear case to provide annular recesses to receive suitable sealing material. In this instance suitable disks 102 are mounted in the recesses and are potted with suitable plastic material to make the construction fluid-tight.

In the construction shown, the second gear 88 is mounted by spaced ball bearings 104 on a fixed upright axle pin 105 that is mounted in aligned apertures in the bottom and top walls respectively of the gear case. The axle pin 105 is relatively short to form annular recesses in the two apertures which recesses are sealed with bodies of potting material 110.

It is apparent that the described construction forms a fluid-tight chamber for the reduction gearing that connects the motor 38 with the ring-shaped gear 65. Since the gear case is effectively sealed around the ring-shaped gear and is effectively potted at the two ends of the shaft 95 and at the two ends of the axle pin 105, and since the encased motor is attached to the gear case in a sealed manner, the highly viscous heat-resistant lubricant is effectively confined to prevent leakage of the lubricant over a long service period. With the rotating parts carried by ball bearings and with all of the moving parts inside the gear casing immersed in the lubricant, the beacon mechanism may be depended upon to run in a smooth manner substantially free from vibration over a long service period.

It is further apparent that the gear train shown in FIG. 4 may be easily assembled before the gear case 36 is mounted in the lamp chamber. With the transformer 42 and the lower lamp socket 28 mounted on the gear case the only components that are mounted directly in the lamp chamber are the capacitor 40 and the upper lamp socket 24. If there is any functional failure in the operation of the beacon, it is a simple matter to remove the gear case and to substitute a new gear case without taking the trouble to analyze the cause of the functional difficulty. Thus the invention makes possible the production of the beacon mechanism at a relatively low cost and further makes it possible to service or repair the beacon in a time saving and cost saving manner.

My description in specific detail of the selected embodiment of the invention will suggest various changes, substitutions and other departures from my disclosure within the spirit and scope of the appended claims.

I claim:

1. In an aircraft beacon wherein a double faced mirror rotates on an upright axis intersecting the mirror at an acute angle to reflect light beams from two lamps located on the axis, one above the mirror and one below, and wherein the mirror and lamps are enclosed in a chamber with consequent heating of the chamber by the lamps to a high temperature, means to support and rotate the mirror comprising:

a substantially horizontal sealed gear case fixedly mounted in the lamp chamber and forming a gear compartment intersecting the upright axis, the gear compartment having a top wall with an opening therein and a bottom wall with an opening therein, the two openings being on said axis for transmission of light from the lower lamp to the underside of the mirror, a portion of the gear case being removable for access into the interior of the case and being normally sealed;

a ring-shaped gear with outer circumferential teeth inside the compartment, said gear having a cylindrical portion extending upward through the opening in the top wall of the case to support and rotate the mirror;

a fluid-tight bearing journaling the gear and sealing the gear compartment around one of the two openings in the walls;

means sealing the gear compartment between the ring-shaped gear and the other of the two openings in the walls;

a sealed motor carried by the gear case;

gearing mounted inside the gear case in a fluid-tight manner and operatively connecting the motor with the ring-shaped gear; and a highly viscous heat resisting lubricant in the gear case immersing the moving parts therein.

2. A combination as set forth in claim 1 in which the means to seal the gear case around the other of said two openings includes a cylindrical flange formed in the gear case around said other opening, the ring-shaped gear and the cylindrical flange meeting with a snug fit to form a seal against leakage of the high viscosity lubricant.

3. A combination as set forth in claim 1 which includes:
gears in the gear case having upright axes;
aligned apertures in the top and bottom walls of the gear case;
means mounted in said aligned apertures to rotatably support the gears on the upright axes; and
plastic material sealing the aligned apertures.

4. In an aircraft beacon wherein a double faced mirror rotates on an upright axis intersecting the mirror at an acute angle to reflect light beams from two lamps located on the axis, one above the mirror and one below, and wherein the mirror and lamps are enclosed in a chamber with consequent heating of the chamber by the lamps to a high temperature, means to support and rotate the mirror comprising:

a substantially horizontal gear case fixedly mounted in the chamber and forming a gear compartment intersecting the upright axis, the gear compartment having a top wall, a bottom wall and an end wall with an aperture therein, a portion of the top wall being removable and being normally sealed, the top and bottom walls having aligned openings therein respectively on said axis for transmission of light from the lower lamp to the underside of the mirror;

a ring-shaped gear with outer circumferential teeth inside the compartment, said gear having a cylindrical portion extending upward through the opening in the upper wall to support and rotate the mirror;

a fluid-tight bearing journaling the ring-shaped gear and sealing the compartment around the opening in the upper wall of the compartment;

means sealing the gear compartment between the ring-shaped gear and the lower wall of the compartment around the opening in the lower wall;

a motor in a motor housing mounted on the exterior of said end wall at said aperture thereof;

means sealing the compartment around the aperture between the motor housing and the end wall, said motor having a drive shaft extending through the aperture into the gear compartment; and reduction gearing in the gear case operatively connecting the drive shaft to the ring-shaped gear.

5. In an aircraft beacon wherein a double faced mirror rotates on an upright axis intersecting the mirror at an acute angle to reflect light beams from two lamps located on the axis, one above the mirror and one below, and wherein the mirror and lamps are enclosed in a chamber with consequent heating of the chamber by the lamps to a high temperature, a unit for assembly outside of the lamp chamber and subsequent installation in the lamp chamber to support and actuate the mirror, said unit comprising:

a gear case adapted to be removably mounted in the chamber between the two lamps, the gear case forming a gear compartment containing a viscous heat-resistant lubricant, the compartment having a top wall, a bottom wall and an end wall at one end of the compartment with an aperture in the end wall, a portion of the walls of the gear case being removable for access to the interior thereof, the top wall and the bottom wall of the gear case having an upper opening and a lower opening respectively concentric to said axis for transmitting light from the lower lamp through the gear case to the mirror;

a ring-shaped gear with outer circumferential teeth in said compartment with a portion of the ring-shaped gear extending through said upper opening and supporting said mirror;

means cooperative with the ring-shaped gear to seal both of said openings against leakage of the lubricant;

a motor in a motor housing mounted on the exterior of said end wall at the aperture in the end wall;

means sealing the compartment around the aperture of the end wall between the motor housing and the end wall;

a drive shaft extending from the motor through the aperture in the end wall into the interior of the compartment;

reduction gearing inside the compartment operatively connecting the drive shaft with the ring-shaped gear; and means engaging the top and bottom walls of the compartment in a fluid-tight manner to support and journal the reduction gearing.

6. A combination as set forth in claim 5 which includes means on the underside of the gear case to support the lower lamp in position on said axis.

7. A combination as set forth in claim 5 in which the length of said gear case is substantially the length of the interior of the lamp chamber and which includes means to releasably connect the opposite ends of the gear case to the opposite ends of the lamp chamber.

References Cited by the Examiner

UNITED STATES PATENTS 2,846,663  8/1958  Heehler et al. _____ 240—49 X

FOREIGN PATENTS 72,199  10/1959  France.

NORTON ANSHER, *Primary Examiner.*